United States Patent [19]

Fendrich, Jr.

[11] 3,875,539

[45] Apr. 1, 1975

[54] HIGH VOLTAGE RIPPLE REDUCTION CIRCUIT

[75] Inventor: Charles Nelson Fendrich, Jr., Elizabethtown, Pa.

[73] Assignee: AMP Incorporated, Harrisburg, Pa.

[22] Filed: Nov. 26, 1973

[21] Appl. No.: 419,169

[52] U.S. Cl. .................... 333/79, 307/297, 328/165, 328/167, 333/80 T

[51] Int. Cl. ........................ H03h 7/02, H03h 11/00

[58] Field of Search ........ 333/79, 80 R, 80 T, 70 R; 307/295, 297, 315, 318; 328/167, 165; 321/10, 11; 323/22 T, 32

[56] References Cited

UNITED STATES PATENTS

| | | | |
|---|---|---|---|
| 2,663,806 | 12/1953 | Darlington | 307/315 |
| 2,892,164 | 6/1959 | Woll | 333/79 X |
| 3,317,819 | 5/1967 | Brodie | 321/10 X |
| 3,395,317 | 7/1968 | Hanson | 321/10 X |
| 3,515,945 | 6/1970 | Bohm | 317/50 |
| 3,546,494 | 12/1970 | Wanlass | 307/315 X |
| 3,553,609 | 1/1971 | Edge | 307/295 X |
| 3,567,965 | 3/1971 | Weinerth et al. | 307/318 X |

OTHER PUBLICATIONS

"The International Dictionary of Physics and Electronics", D. Van Nostrand, Princeton, N.Y., 1961, QC5I5C.4; pages 304 and 1166.

Oakes et al., "Transistor Filters Ripple", in Electronics, (Engineering Edition), April 11, 1958; page 95.

Wouk, "High-Voltage Supply Uses Electronic Filter", in Electronics, August, 1955; pages 154–155.

*Primary Examiner*—Eli Lieberman
*Assistant Examiner*—Marvin Nussbaum
*Attorney, Agent, or Firm*—Gerald K. Kita

[57] ABSTRACT

The disclosure relates to a high voltage power supply having a ripple reduction circuit. The ripple in the circuit is reduced by substituting for the conventional filter circuits of the prior art a ripple reducing circuit having protection against transients as well as short circuits. The ripple reducing circuit is composed of a pair of emitter follower transistors with a capacitor in the base circuit thereof and across the high voltage power supply, the effective capacitance of the capacitor being the product of the capacitance of the capacitor and the product of the betas of the transistors of the circuit. The end result is a ripple reducing circuit having the same ripple reducing action as prior art filters but of much smaller size and lighter weight due to the decreased size of capacitor required.

6 Claims, 1 Drawing Figure

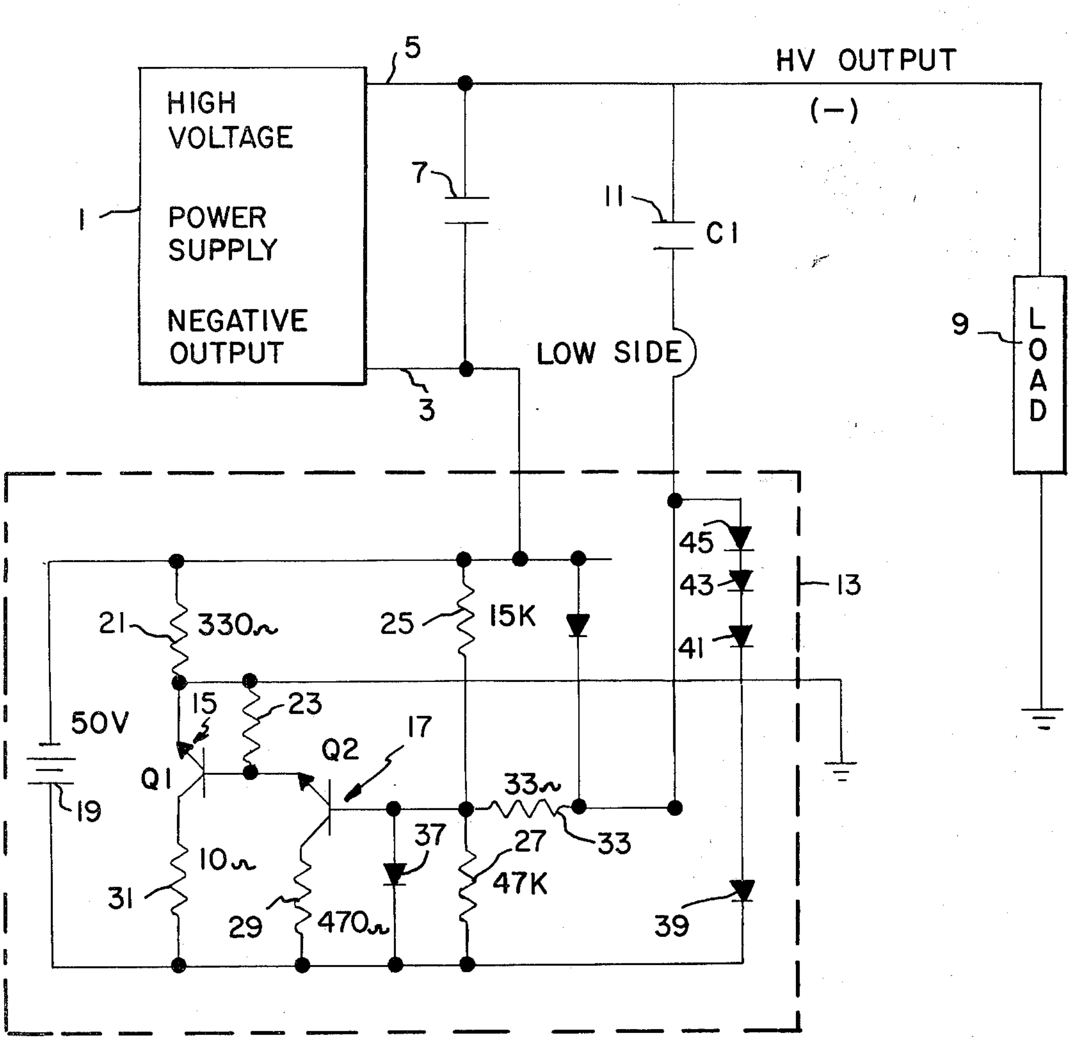
HIGH VOLTAGE POWER SUPPLY NEGATIVE OUTPUT
HV OUTPUT
(−)
C1
LOW SIDE
LOAD
330Ω
15K
50V
Q1
Q2
33Ω
10Ω
470Ω
47K

HIGH VOLTAGE RIPPLE REDUCTION CIRCUIT

This invention relates to a high voltage ripple reduction circuit and, more specifically to a ripple reducing circuit having a capacitor with an effective capacitance in the circuit which is much greater than its actual capacitance.

High voltage power supplies of the prior art have been designed to provide essentially ripple-free outputs. This has been accomplished by providing filter circuits at the power supply output having large value capacitors to provide maximum shunting of any ripple to ground or reference potential. While this procedure has great merit, it is often necessary to provide ripple-free high voltage power supplies which are light and compact. This is difficult if at all possible to do with the prior art systems due to the great weight and bulk of large value high voltage capacitors.

In accordance with the present invention, the above noted problems of the prior art are materially minimized and there is provided a high voltage power supply which is essentially ripple-free and, at the same time relatively low in bulk and low in weight. Briefly, the above is accomplished by providing a ripple reduction circuit at the output of a high voltage power supply which is essentially an emitter follower circuit in series with the high voltage output terminal having a power supply, the capacitor in the base circuit of the emitter follower being coupled to the high voltage output terminal of the power supply and presenting thereto an effective capacitance equal to the capacitance of the capacitor multiplied by the product of the betas of the transistors of a Darlington circuit which essentially form the emitter follower circuit. In this way, a large effective capacitance is placed in shunt with the output of the high voltage power supply utilizing a relatively small value, small and light capacitor.

It is therefore an object of this invention to provide a ripple reduction circuit for a high voltage power supply which is relatively light and of small bulk.

It is a further object of this invention to provide a ripple reduction circuit for a high voltage power supply capable of placing a high effective capacitance in shunt with the output of the power supply using a relatively small value capacitor.

It is a yet further object of this invention to provide a ripple reduction circuit for a high voltage power supply utilizing an emitter follower circuit in series with the output of the power supply with a capacitor in the base circuit coupled back to the output of the power supply.

The above objects and still further objects of the invention will immediately become apparent to those skilled in the art after consideration of the following preferred embodiment thereof, which is provided by way of example and not by way of limitation, wherein:

The FIGURE is a circuit diagram of a high voltage ripple reduction circuit in accordance with the present invention.

Referring now to the FIGURE, there is shown a standard high voltage power supply 1 having a positive output terminal 3 and a negative output terminal 5. A standard filter capacitor 7 is coupled across the terminals 3 and 5. A load 9 is coupled between the terminal 5 and ground.

The ripple reduction circuit for the high voltage power supply includes a capacitor 11 (C1) which is coupled to a capacitance multiplying circuit 13. In effect, the circuit 13 multiplies the effective capacitance of capacitor 11 by the product of the betas of the transistors 15 (Q1) and 17 (Q2). The transistors 15 and 17 operate as an emitter follower circuit with capacitor 11 in the base circuit thereof, transistors 15 and 17 being connected to form a high gain circuit.

The multiplying circuit 13 includes a power supply 19 to provide bias voltage thereto. Resistor 21 is provided to complete the current path for current flowing from power supply 19 through the transistor 15 and back to supply 19 and is part of the load of supply 19. Resistors 23, 25 and 27 are biasing resistors and resistors 29, 31 and 33 are provided for protection. The diodes 35, 37, 39, 41, 43 and 45 are blocking diodes and protect the transistors against transients and short circuits in the power supply 1.

It can be seen that there has been provided a high voltage ripple reduction circuit which can be provided in a compact and light package relative to prior art circuits of similar type.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A ripple reduction circuit for a high voltage power supply having a pair of output terminals and

- capacitor means connected across said output terminals, including
- a resistive impedance connected between one of said output terminals and a load,
- an amplifying circuit including transistor means,
- said resistive impedance being connected in series with the collector-emitter path of the transistor means and an independent current source,
- and means coupling said capacitor means to the electrodes of the transistor means to control the current through the collector-emitter path and the resistive impedance to reduce the ripple current therethrough.

2. A ripple reduction circuit according to claim 1 wherein the transistor means includes an emitter follower circuit.

3. A ripple reduction circuit as set forth in claim 1 further including protection means coupled across said amplifying circuit to divert large transient currents therethrough.

4. A ripple reduction circuit as set forth in claim 2 further including protection means coupled across said amplifying circuit to divert large transient currents therethrough.

5. A ripple reduction circuit as set forth in claim 4 wherein said protection means is a plurality of serially connected diodes.

6. A ripple reduction circuit as set forth in claim 3 wherein said protection means is a plurality of serially connected diodes.

* * * * *